United States Patent
Stiles

(10) Patent No.: US 9,909,266 B1
(45) Date of Patent: Mar. 6, 2018

(54) REFLECTIVE AND DIRECTIONAL WATER PERMEABLE PAVER SYSTEM

(71) Applicant: Stiles Manufacturing, LLC, Houston, TX (US)

(72) Inventor: Barry J. Stiles, Houston, TX (US)

( * ) Notice: Subject to any disclaimer, the term of this patent is extended or adjusted under 35 U.S.C. 154(b) by 0 days.

(21) Appl. No.: 15/795,940

(22) Filed: Oct. 27, 2017

Related U.S. Application Data

(63) Continuation-in-part of application No. 15/255,853, filed on Sep. 2, 2016, now Pat. No. 9,617,698.

(60) Provisional application No. 62/272,261, filed on Dec. 29, 2015.

(51) Int. Cl.
| | | |
|---|---|---|
| *E01C 11/24* | (2006.01) | |
| *E01C 3/00* | (2006.01) | |
| *E01C 9/00* | (2006.01) | |
| *E01F 9/559* | (2016.01) | |
| *E01C 17/00* | (2006.01) | |

(52) U.S. Cl.
CPC .............. *E01C 11/24* (2013.01); *E01C 17/00* (2013.01); *E01F 9/559* (2016.02); *E01C 3/003* (2013.01); *E01C 9/004* (2013.01)

(58) Field of Classification Search
CPC .... E01C 11/24; E01C 11/225; E01C 2201/12; E01C 2201/02; E01C 2201/04; E01C 9/004; E01C 9/086; E01C 9/08; E01C 15/00; E01C 5/00; E01C 5/20
See application file for complete search history.

(56) References Cited

U.S. PATENT DOCUMENTS

| | | | | |
|---|---|---|---|---|
| 3,909,996 A * | 10/1975 | Ettlinger, Jr. | ............. | E01C 5/20 15/215 |
| 4,440,818 A * | 4/1984 | Buchan | ................... | E01C 5/005 428/117 |
| 4,826,351 A * | 5/1989 | Haberhauer | .............. | E01C 5/20 404/35 |
| 5,250,340 A * | 10/1993 | Bohnhoff | ................ | E01C 9/004 404/36 |
| 5,308,186 A * | 5/1994 | Hedgewick | ............. | E01F 9/553 404/14 |
| 5,406,745 A * | 4/1995 | Lin | ......................... | A01G 9/028 404/41 |
| 5,507,600 A * | 4/1996 | Takahashi | ............... | E02D 29/12 404/14 |
| 5,527,128 A * | 6/1996 | Rope | ......................... | E01C 5/20 404/35 |

(Continued)

*Primary Examiner* — Abigail A Risic
(74) *Attorney, Agent, or Firm* — Buskop Law Group, P.C.; Wendy Buskop

(57) ABSTRACT

A reflective and directional water permeable paver system, which has a plurality of connection cells and is configured to support traffic, includes a marker insert. The marker insert has a continuous body wall with at least one tensioning marker rib extending from the continuous body wall. The marker insert has an insert head. The insert head diameter extending beyond the continuous body wall of the marker insert. The marker insert body diameter is substantially equal to the inner wall diameter of at least one of the connection cells. The insert head has a prismatic inner surface composed of an array of mirrored polygonal shapes providing at least three different reflective light vectors. The insert head has a translucent top surface covering the prismatic inner surface enabling light to penetrate to the inner surface and reflect outwardly from the insert head.

18 Claims, 12 Drawing Sheets

(56) References Cited

U.S. PATENT DOCUMENTS

| | | | | |
|---|---|---|---|---|
| 5,628,160 | A * | 5/1997 | Kung | E01C 5/20 403/11 |
| 5,816,738 | A * | 10/1998 | Harnapp | E01C 5/20 404/18 |
| 5,992,106 | A * | 11/1999 | Carling | E01C 5/20 52/177 |
| 6,301,842 | B1 * | 10/2001 | Chaney | E04B 5/12 52/177 |
| 6,682,257 | B1 * | 1/2004 | Zappe | E02D 29/14 404/25 |
| 8,734,049 | B1 * | 5/2014 | Stiles | E01C 11/24 404/36 |
| 8,807,865 | B1 * | 8/2014 | Modrono | E01C 13/065 404/27 |
| 9,617,698 | B1 * | 4/2017 | Stiles | E01F 9/559 |
| 9,670,624 | B1 * | 6/2017 | Stiles | E01F 9/553 |
| D792,987 | S * | 7/2017 | Stiles | D25/155 |
| 2006/0263146 | A1 * | 11/2006 | Moralez | E01C 9/004 404/36 |
| 2008/0052986 | A1 * | 3/2008 | Son | A63C 19/04 47/31.1 |
| 2008/0072514 | A1 * | 3/2008 | Barlow | A63B 69/3661 52/540 |
| 2013/0287493 | A1 * | 10/2013 | Rusch | E01F 9/06 404/13 |
| 2014/0270945 | A1 * | 9/2014 | Bach | E01C 5/20 404/36 |

* cited by examiner

REFLECTIVE AND DIRECTIONAL WATER PERMEABLE PAVER SYSTEM

CROSS REFERENCE TO RELATED APPLICATIONS

The current application is a continuation-in-part of co-pending U.S. Non-Provisional patent application Ser. No. 15/255,853, filed Sep. 2, 2016, which claims priority to and the benefit under 35 U.S.C. § 119(e) of U.S. Provisional Patent Application Ser. No. 62/272,261, filed on Dec. 29, 2015. The disclosure of each application is hereby incorporated herein by reference in its entirety for all purposes.

FIELD

The present embodiments generally relate to a reconfigurable one piece water permeable paver forming a surface for traffic, such as a parking lot, a roadway, a golf cart path, a trail, a temporary roadway, a bicycle path, a jogging trail, a greenway space, a freight yard, a fire lane, a sidewalk, or another area where it is desirable for water to flow through rather than around a surface.

BACKGROUND

A need exists for a reconfigurable one piece water permeable paver that allows traffic and parking surfaces to be formed that enables grass to grow through the surface or contains aggregate, such as gravel, which allows water to permeate through the traffic and parking surface.

A need also exists for a reconfigurable one piece water permeable paver that can be a one piece molded unit created from recycled plastics, such as recycled milk bottles.

The present embodiments meet these needs.

BRIEF DESCRIPTION OF THE DRAWINGS

The detailed description will be better understood in conjunction with the accompanying drawings as follows.

Figure 1:
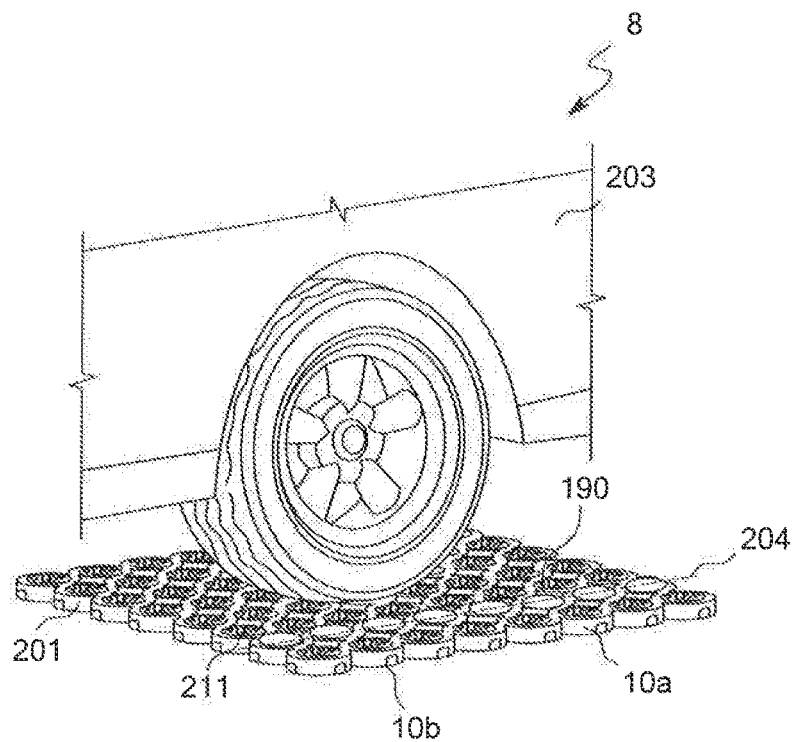
FIG. 1 depicts a load supporting surface using the reflective and directional water permeable paver system.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The embodiments relate to a reflective and directional water permeable paver system for forming a surface suitable for traffic.

The embodiments relate to use of a unique marker insert on different configurations of a reconfigurable one piece water permeable pavers configured to both direct and support traffic.

The unique marker insert can be a molded plastic article.

The reconfigurable one piece water permeable paver prevents flash flooding and thereby costly property damage and loss of life, by managing water flow and drainage in areas that otherwise present solid surfaces with little or no ability to absorb water.

The reconfigurable one piece water permeable paver helps improve the environment by enabling the removal of diesel, gasoline, oil and other pollutants from storm water through natural bioremediation before these pollutants enter a natural aquifer and poison drinking water supplies which could lead to serious illness or death.

The reconfigurable one piece water permeable paver helps reduce rising temperatures from climate change and helps reduce environmental damage done to the planet due to the dramatic heating effects caused by the use of concrete and asphalt for traffic and parking surfaces.

The reconfigurable one piece water permeable paver improves the health of the planet by utilizing and recycling post-consumer and industrial waste that clog landfills. The reconfigurable one piece water permeable paver uses plastic trash, and recycles the plastic trash into a construction material usable to build parking lots, roadways, sidewalks and other traffic surfaces, including golf cart trails.

The reconfigurable one piece water permeable paver helps improve lifestyles for the handicapped or disabled persons as well as improve lifestyles for the elderly and children by enabling the construction of unobstructed and safe park trail ways. This reconfigurable one piece water permeable paver enables the construction of access ways to nature conservancies by providing inexpensive, natural grass and gravel ADA compliant walkways. The invention enables the construction of trails that are level and safe, preventing broken bones and other serious injuries and even death due to a fall.

The reconfigurable one piece water permeable paver prevents fire disasters by creating erosion resistant structures that include grass filled fire lanes so fire and emergency vehicles don't get stuck in the mud or prevented from reaching remote areas in a disaster as often happens in wildfire situations in California.

The reconfigurable one piece water permeable paver enables police and emergency responders to quickly install a roadway in a muddy area to quickly access a damaged area, where a permanent roadway was washed away.

The reconfigurable one piece water permeable paver provides roadways for occasional use by emergency vehicles and fire trucks in areas where the expense of a concrete roadway or asphalt roadway is prohibitive. The reconfigurable one piece water permeable paver enables the creation of inexpensive fire lanes, emergency lanes and maintenance vehicle lanes.

The embodiments relate to a reconfigurable one piece water permeable paver which can be interlocked together to create a system for soil stabilization. Soil stabilization can be achieved by connecting a plurality of reconfigurable one piece water permeable pavers together and filling the cells of the water permeable pavers with soil or aggregate.

The embodiments relate to a reconfigurable one piece water permeable paver for use with a storm water management system. Storm water management can be achieved by connecting together a plurality of reconfigurable one piece water permeable pavers and installing the connected reconfigurable one piece water permeable pavers adjacent a bayou or waterway.

The embodiments relate to a parking lot, a road, airplane taxi way, driveway, walkway, storage area, RV park, temporary and removable roadway such as for hurricane relief and hurricane evacuation, elevated greenway structure having connected reconfigurable one piece water permeable pavers which have connection cells filled with aggregate and/or dirt allowing water to pass through the structure without flooding surrounding areas.

The embodiments relate to a parking lot formed from connected reconfigurable one piece water permeable pavers with cells filled with dirt or grass or aggregate. In embodiments, the parking lot is an occasional use event parking lot or an industrial parking lot for staging of oil field drilling equipment.

The following terms are used herein:

The term "cell" as used herein can refer to the cylindrical molded shapes which are connected to either other cells or to a flex joint to form the reconfigurable one piece water permeable paver. Cells can also be elliptical, rectangular, square or another polygon.

The term "locking tab" as used herein can refer to a protrusion or other comparable "male" structure extending from a cell of the paver that is matable with a respective fastening slot of another paver.

The term "fastening slot" as used herein can refer to a slot or other comparable 'female' structure formed in a cell of the paver that can facilitate an interlocking connection with a respective locking tab of another paver.

The term "marker insert" as used herein can refer to an insert, which can be plastic, and which provides a visual indicator creating parking zones or parking areas. A plurality of the marker inserts, used in a plurality of cells of the reconfigurable one piece water permeable paver, can create a parking series of dots, acting like a parking stripe. The marker insert can be non-deforming when driven over by a motorized vehicle.

The term "tensioning marker rib" as used herein can refer to protruding plastic beam extending from the marker insert body wall. The tensioning marker rib creates a friction fit between the marker insert and the reconfigurable one piece water permeable paver cells.

The term "insert head" as used herein can refer to a shape selected from the group: a dome shape, an arced rectangle, an arced square, or another arced polygon that extends from the marker body wall and protrudes above the reconfigurable one piece water permeable paver cell. The insert head uses an array of mirrored polygonal shapes and a translucent top surface to reflect light outward from the insert head.

The term "flexible locking dog" as used herein refers to an extension from the marker body wall configured to flex inward into or under the inner wall of an at least one of the plurality of inner cells or outer cells when the marker insert comes into approximate contact with the respective permeable bottom portion.

The term "clearance recesses" as used herein can refer to cutout in the marker body wall that allows clearance for the reconfigurable one piece water permeable paver locking tab to pass through when one paver is connected to another, allowing the marker insert to be properly positioned in the cell.

The term "paver plate" as used herein can refer to a planar part which attaches to the reconfigurable one piece water permeable paver. The paver plate having a top side formed over a plurality of intersecting beams with a plurality of grooves extending into the top side of the paver plate, a plurality of ribs extending through the top side of the paver plate, and a plurality of perforations extending from the top side of the paver plate. The paver plate has at least one integral interlocking support integrally extending from the plurality of intersecting beams for locking to a connection cell of the reconfigurable one piece water permeable paver. The at least one integral interlocking support has a body, which connects the paver plate to the connection cell of the reconfigurable one piece water permeable paver.

The term "locating slot" as used herein can refer to cutout which aligns the marker insert to provide correct orientation of the marker insert within the cell. The cutout corresponds with a locating rib on the reconfigurable one piece water permeable paver cell wall.

The term "prismatic inner surface" as used herein can refer to an array of mirrored polygon shapes at 90 degree angles in relation to each other allowing the reflection of light back towards the light source regardless of what angle the light source originated from.

The term "translucent top surface" as used herein can refer to a protective covering over the prismatic inner surface enabling light to penetrate onto the mirrored inner surface and reflect outwardly from the insert head.

The term "reflective light vectors" as used herein can refer to magnitude and direction of the light reflected from the mirrored inner surface.

The term "head reinforcing beams" as used herein can refer to one or more projections from the inner surface of the marker insert to provide top load strength of at least 3000 pounds per square inch.

The term "inner flange" as used herein can refer to a sloped, triangular shaped structure when viewed in a side view that provides additional load support when each cell is filled with gravel, dirt, or aggregate. The inner flange specifically creates an increased surface area to prevent the reconfigurable one piece water permeable paver from being pushed into soil, keeping the paver level.

The term "parking marker" as used herein can refer to an insert, which can be plastic, and which provides a visual indicator creating parking zones or parking areas, and a plurality of the parking markers, used in a plurality of cells of the paver can create a parking series of dots, acting like a parking stripe. The plastic indicator can be non-deforming when driven over by a car.

Turning now to the Figures, FIG. 1 depicts a reflective and directional water permeable paver system 8 with a plurality of connected reconfigurable water permeable pavers 10a and 10b forming a traversable load bearing surface, in accordance with embodiments of the disclosure.

The reflective and directional water permeable paver system 8 can include a plurality of pavers 10a and 10b. One or more of the plurality pavers 10a, 10b can include a filler material 211 therein.

The reflective and directional water permeable paver system 8 has a plurality of locking tabs for each permeable paver engaging the plurality of fastening slots of an additional reconfigurable paver, each reconfigurable one piece water permeable paver 10*a* and 10*b* further configured to form a traffic surface 201 for supporting a load, such as a parked or moving vehicle 203.

The reflective and directional water permeable paver system 8 can include a plurality of insert markers 190. Although not limited to any particular pattern, the insert markers 190 can be inserted into the pavers 10*a* and 10*b* of system 8 in a manner that forms a line 204 or other desired marker pattern. Multiple lines 204 can be created to form, for example, a marked parking spot.

It should be appreciated that although shown here in a partial view as a few pavers, that as many pavers that are necessary to form the desired surface (such as a road, a traffic lane for a road, or a parking lot space) can be used together in an interlocking manner accordingly.

In addition, although not illustrated here, it should be appreciated and apparent that the reflective and directional water permeable paver system 8 can be readily and easily positioned onto or into an earthen surface at a preset geographic area.

In embodiments, the reflective and directional water permeable paver can be made from recycled plastics, such as milk bottles.

In embodiments, the double walled water permeable modular paver can be pigmented with soy based pigments to be environmentally friendly.

Figure 2:
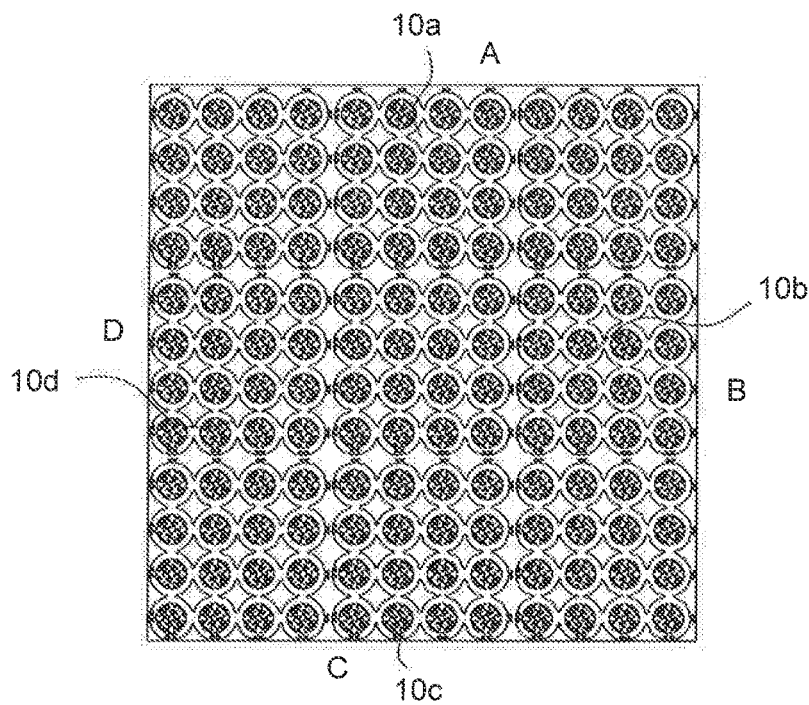
FIG. 2 depicts a plurality of connected reconfigurable one piece water permeable pavers forming the system according to one or more embodiments.

FIG. 2 illustrates the reflective and directional water permeable paver system 8, which can be configured for interlocking connection to one or more of a plurality of additional reconfigurable one piece water permeable pavers 10*a*-10*d* (with additional pavers connected to those pavers). The reflective and directional water permeable paver system can be configured for interlocking connection at a "12 o'clock position" to paver 10*a* (position "A"), a "3 o'clock position" to paver 10*b* (B), a "6 o'clock position" to paver 10*c* (C), and a "9 o'clock position" paver 10*d* (D).

Although the reconfigurable one piece water permeable pavers 10*a*-10*d* shown as identical, it is within the scope of the disclosure that various pavers of the system can be different. As would be apparent to one of skill in the art, it is also within the scope of the disclosure that a paver could have more than four connection clock "positions". For example, a six-sided paver can have six connecting clock positions (e.g., 2, 4, 6, 8, 10, and 12).

The locking tabs of the reconfigurable one piece water permeable paver can interlock with the fastening slots of a respective adjacent reconfigurable water permeable paver 10*a*, 10*b*, 10*c*, and/or 10*d*. The reconfigurable one piece water permeable pavers can be part of a system useable to create a roadway, trail, or similar traffic surface.

Figure 3:
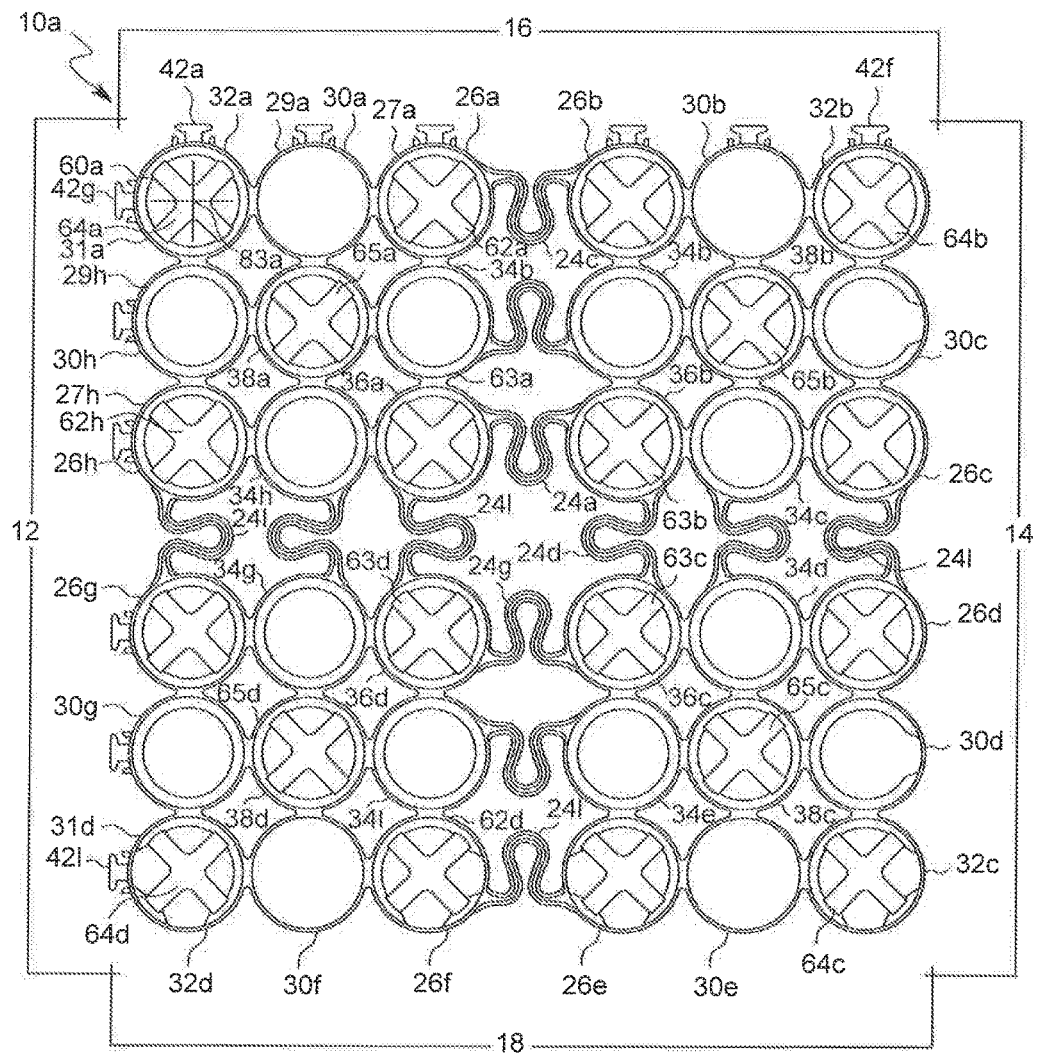
FIG. 3 depicts a single wall reconfigurable one piece water permeable paver usable in the system.

FIG. 3 depicts a top view of a reconfigurable one piece water permeable paver according to one or more embodiments.

The reconfigurable one piece water permeable paver 10*a* can be made from a plurality of different types of cells connected to each other, to flex joints 24*a*-24*l*, or to both.

The reconfigurable one piece water permeable paver can have a first side 12, a second side 14 opposite the first side 12, a third side 16 between the first side 12 and the second side 14, and a fourth side 18 between the first side 12 and the second side 14 opposite the third side 16.

The reconfigurable one piece water permeable paver 10*a* can have a plurality of outer flex joint connection cells 26*a*-26*h*. Each outer flex joint connection cell can engage a flex joint from the plurality of flex joints 24*a*-24*l*.

Each outer flex joint connection cell can have an outer flex joint connection cell outer surface 27*a*-27*h*.

According to one or more embodiments, the reconfigurable one piece water permeable paver 10*a* can have a plurality of outer three connection cells 30*a*-30*h*.

Each outer three connection cell 30*a*-30*h* can be connected to one of the outer flex joint connection cells 26*a*-26*h*.

Each outer three connection cell can have an outer three connection cell outer surface 29*a*-29*h* respectively.

According to one or more embodiments, the reconfigurable one piece water permeable paver 10*a* can have a plurality of outer two connection cells 32*a*-32*d*.

Each outer two connection cell 32*a*-32*d* can connect to two adjacent outer three connection cells 30*a*-30*h*.

Each outer two connection cell can have an outer two connection cell outer surface 31*a*-31*d*.

According to one or more embodiments, the reconfigurable one piece water permeable paver 10*a* can have a plurality of inner single flex joint connection cells 34*a*-34*h*.

Each inner single flex joint connection cell 34*a*-34*h* can be connected to one of the flex joints 24*a*-24*l*.

According to one or more embodiments, the reconfigurable one piece water permeable paver 10*a* can have a plurality of inner dual flex joint connection cells 36*a*-36*d*.

Each inner dual joint connection cell can engage two flex joints simultaneously.

The reconfigurable one piece water permeable paver 10*a* can have a plurality of inner four connection cells 38*a*-38*d*.

Each of the inner four connection cells 38*a*-38*d* can connect to a pair of outer three connection cells 30*a*-30*h* and to a pair of inner single flex joint connection cells 34*a*-34*h*.

In embodiments, the reconfigurable one piece water permeable paver 10*a* can have an X-shaped anchor 62*a*-62*h* in each outer flex joint connection cell 26*a*-26*h*.

In embodiments, the reconfigurable one piece water permeable paver 10*a* can have an X-shaped anchor 63*a*-63*d* in each inner dual flex joint connection cells 36*a*-36*d*.

In embodiments, the reconfigurable one piece water permeable paver 10*a* can have X-shaped anchor 64*a*-64*d* in each of the outer two connection cells 32*a*-32*d*.

In embodiments, the reconfigurable one piece water permeable paver 10*a* can have an X-shaped anchor 65*a*-65*d* in each of the four connection inner cells 38*a*-38*d*.

Each cell can have a center point, such as outer two connection cell 32*a* having center point 83*a*.

In embodiments, the reconfigurable one piece water permeable paver can have the plurality of outer flex joint connection cells 26*a*-26*h* connecting adjacent cells at one of the clock positions: a 12 o'clock position, a 3 o'clock position, a 6 o'clock position and a 9 o'clock position.

In embodiments, the reconfigurable one piece water permeable paver 10*a* can have the plurality of outer three connection cells 30*a*-30*h* connected to one adjacent outer flex joint connection cell 26*a*-26*h*, one adjacent outer two connection cell 32*a*-32*d* and one adjacent inner four connection cell 38*a*-38*d* at one of the clock positions: a 12 o'clock position, a 3 o'clock position, a 6 o'clock position and a 9 o'clock position.

In embodiments, the reconfigurable one piece water permeable paver 10*a* can have the plurality of outer two connection cells 32*a*-32*d* connected to two adjacent outer three connection cells 30*a*-30*h* at one of the following clock positions on the outer surface of each cell: a 12 o'clock position, a 3 o'clock position, a 6 o'clock position and a 9 o'clock position.

In embodiments, the reconfigurable one piece water permeable paver 10*a* can have the plurality of inner single flex joint connection cells 34*a*-34*h* connected to a flex joint 24*a*-24*l* at a clock position on the outer surface of each inner single flex joint connection cell that is at one of the clock positions: a 12 o'clock position, a 3 o'clock position, a 6 o'clock position or a 9 o'clock position.

In embodiments, the reconfigurable one piece water permeable paver 10*a* can have the plurality of inner dual flex joint connection cells 36*a*-36*d* connected to a flex joint 24*a*-24*l* on the outer surface of each inner dual flex joint connection cell at one of the clock positions: a 12 o'clock position, a 3 o'clock position, a 6 o'clock position and a 9 o'clock position.

In embodiments, the reconfigurable one piece water permeable paver 10*a* can have the inner four connection cells 38*a*-38*d* connected to adjacent cells at a clock position on the outer surface of each cell at one of the clock positions: a 12 o'clock position, a 3 o'clock position, a 6 o'clock position and a 9 o'clock position.

According to one or more embodiments, the reconfigurable one piece water permeable paver 10*a* can have a plurality of locking tabs 42*a*-42*f* extending from outer surfaces of cells forming the third side 16 of the reconfigurable one piece water permeable paver 10*a*.

The reconfigurable one piece water permeable paver 10*a* can have a plurality of locking tabs 42*g*-42*l* extending from outer surfaces of cells forming the first side 12 of the reconfigurable one piece water permeable paver.

Each cell can have an inner flange 60*a*. Inner flange 60*a* is depicted on an outer two connection cell 32*a*.

Each inner flange can extend toward the center point 83 of each cell. Each inner flange can extend from the bottom of the reconfigurable one piece water permeable paver 10*a*.

In embodiments, a parking marker in at least one of the connection cells.

Figure 4A:
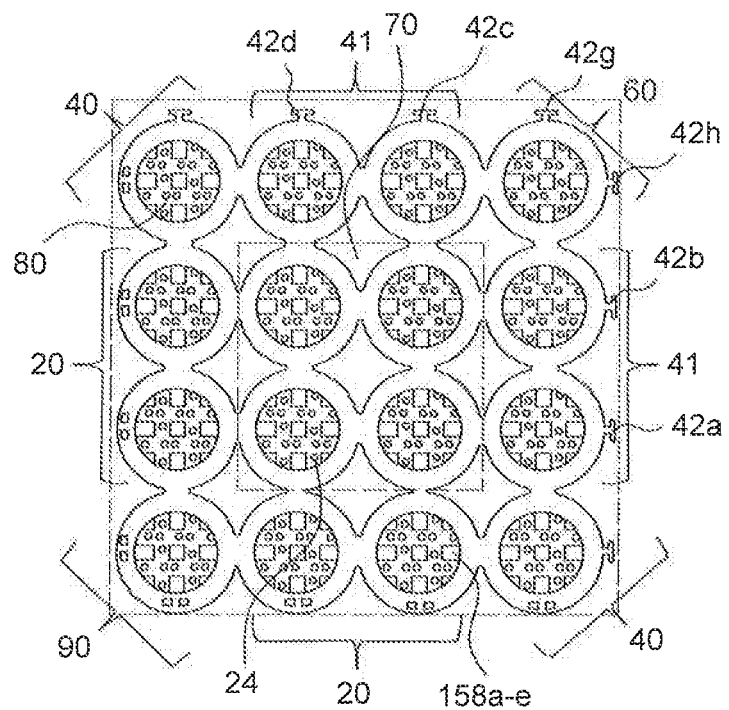
FIGS. 4A-4B depict a double wall reconfigurable one piece water permeable paver usable in the system.
Figure 4B:
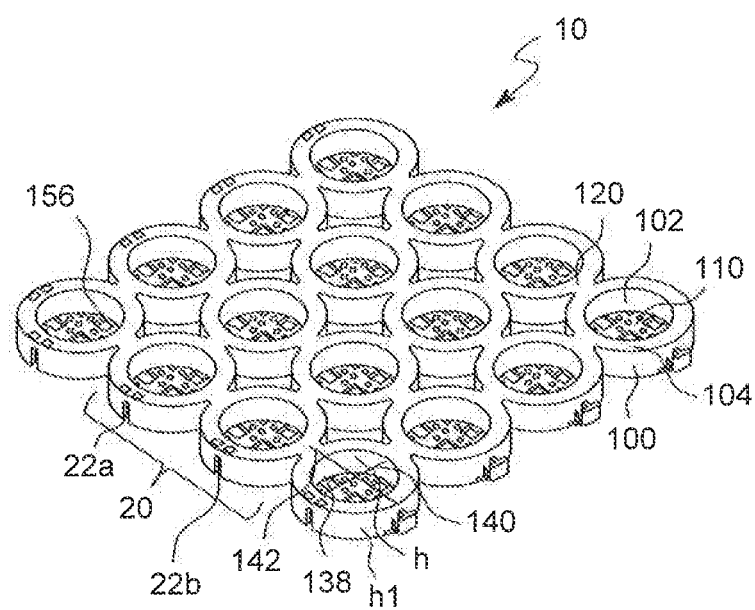

FIGS. 4A and 4B depict a downward top view and an isometric top view reconfigurable one piece water paver in accordance with embodiments of the disclosure, are shown.

The reconfigurable one piece water paver 10 includes a plurality of connected cells (directly or indirectly). The cells can be connected in a manner that forms a particular paver shape, such as rectangular, square, trapezoidal, symmetrical, asymmetrical, or any other suitable shape. Moreover one or more cells of the paver 10 can be varied in shape, such as circular, in order to accommodate certain paver shapes.

The figures illustrate the reconfigurable one piece water permeable paver 10 having a plurality of outer cells 80 arranged in a 4-cell×4-cell square configuration. The reconfigurable one piece water permeable paver 10 can have a size (L×W) of a range of about 5"×5" to about 48"×48". In an embodiment the reconfigurable one piece water permeable paver 10 can have a size of about 24" (L) to about 24" (W). Although shown as 'square', the paver 10 does not have to have equal length and width. However, the square nature of the embodiment depicted in FIGS. 4A and 4B provides desirable modularity, and can reduce storage and shipping cost. A symmetrical shape can aid in architectural modeling design and use of the paver 10.

The reconfigurable one piece water permeable paver 10 can have a weight in a range of about 3 lbs. to about 10 lbs. The reconfigurable one piece water permeable paver 10 can have a material of construction, which can be, for example a polyethylene-based material. In an embodiment, the material of construction can be an eco-friendly post-use recycled HDPE. In an embodiment, the material of construction can be nylon-based, which can be useful to aid the reconfigurable one piece water permeable paver 10 in withstanding the effects of temperature and other unfavorable factors related to use of the paver 10 in the ground.

As the reconfigurable one piece water permeable paver 10 can be integral and one piece in its construction, the paver 10 can be readily manufactured through a conventional molding process, such as injection molding. The reconfigurable one piece water permeable paver 10 can be configured to withstand a load of up to about 8,000 psi, but loads in excess of 8,000 psi remain possible.

The reconfigurable one piece water permeable paver 10 can include a plurality of outer cells 80 that can form a perimeter around a plurality of inner cells 70. The pattern or arrangement of the outer cells 80 can be described by grouping the cells by similar structure. Thus, there can be a first group 20 of outer cells 80, each respectively comprising a keyway 22*a* and 22*b*. In an embodiment, the first group 20 can include about 4 outer cells 80. One or more outer cells 80 of the first group 20 can be connected directly and/or indirectly with other outer cells 80 of the first group 20.

The keyway(s) 22*a* and 22*b* can be formed in a generally outer tangential portion of its respective outer wall 100. The keyway 22*a* and 22*b* can be a 'groove' formed in the outer wall 100 that can be approximated to about 1" in height from a bottom of the reconfigurable one piece water permeable paver 10, and can be about ⅜" to about ¾" wide.

There can be a second group 41 of outer cells 80, each respectively comprising a locking tabs 42*a*-42*d*. In an embodiment, the second group 41 can include about four outer cells 80. One or more outer cells 80 of the second group 14 can be connected directly and/or indirectly with other outer cells 80 of the second group 41.

The locking tabs 42*a*-42*d* can have a protruding "T" shape (from downward or upward view) from the outer wall 100, extending about ½" inch therefrom.

There can be a third group 40 of outer cells 80. The outer cells 80 of the third group 40 can each respectively include the keyways and the locking tabs 42*e*-42*f*. In an embodiment, the second group 41 can include about two outer cells 80. One or more outer cells 80 of the third group 40 can be a corner cell.

There can be a fourth group 90 of outer cells 80. In an embodiment, the fourth group 90 can be a corner cell and include two keyways.

There can be a fifth group 60 of outer cells 80. In an embodiment, the fourth group 60 can be a corner cell and include two locking tabs 42*g-h*.

The reconfigurable one piece water permeable paver 10 can include a plurality of inner cells 70. One or more of the plurality of inner cells 70 can be positionably adjacent and conjoined with four other cells, which can be inner cells 70 and/or outer cells 80.

In aspects, at least one or more of the first group 20 of outer cells 80 can be connected to the fourth outer cell 90. In aspects, at least one of the first group 20 of outer cells 80 can be connected to an adjacent cell of the third group 40 of outer cells 80, and/or can be connected to at least one of the plurality of inner cells 70. In aspects, at least one of the second group 41 of outer cells 80 can be connected to at least one of: an adjacent cell of the third group 40 of outer cells 80, to the fifth outer cell 60, to one of the plurality of inner cells 70, and combinations thereof.

The reconfigurable one piece water permeable paver 10 can include a plurality of third walls 120. One or more of the plurality of third walls 120 can connect: one of the outer cells 80 with one of the inner cells 70, one of the outer cells 80 with another one of the outer cells 80, or one of the inner cells 70 with another one of the plurality of inner cells 70.

The reconfigurable one piece water permeable paver 10 can include a plurality of gaps 158a-e formed between four connected cells, each gap, and a top 124, and a bottom 126 of the reconfigurable one piece water permeable paver 10.

The reconfigurable one piece water permeable paver 10 can include a light module (not shown here) in at least one of the plurality of outer cells 80, the plurality of inner cells 70, and combinations thereof.

The locking tabs 42a-42h for each respective outer cell 80 can be formed integral to the respective outer wall 100 between the bottom and the top of the reconfigurable one piece water permeable paver 10.

The keyways 22a-22h for each respective outer cell 80 can be cut from the bottom 126 of the paver 10, including partially to substantially, towards the top 124.

The top surface 104 can be substantially planar. The reconfigurable one piece water permeable paver can be made of recycled plastic. The plurality of inner cells 70 can have about four inner cells. The plurality of outer cells 80 can have about twelve outer cells.

The permeable bottom portion 110 comprises a predetermined pattern in the form of at least one of an I, H, X, W, M, L, Z, and the hashtag ('#') symbol.

Each of the plurality of outer cells 80 and the plurality of inner cells 70 can include a locating rib 24 formed on the respective inner wall 102.

The reconfigurable one piece water permeable paver 10 can include a plurality of gaps formed between four connected cells each gap and the top 124 and the bottom 126 of the paver.

Multiple reconfigurable one piece water permeable pavers 10 can be connected together to form a load bearing traffic surface.

While the plurality of inner cells 70 and plurality of outer cells 80 can have differences in terms of, for example, relational position and structure, the plurality of inner cells 70 and plurality of outer cells 80 of the reconfigurable one piece water permeable paver 10 can include a number of common features and sub-features, such as being circular or ring-shape in nature.

As shown in the Figures, each of the plurality of outer cells 70 and plurality of inner cells 80 can include an outer wall 100; an inner wall 102; a top surface 104 integrally formed or connected between the outer wall 100 and the inner wall 102.

The inner wall 102 can help define a cell volume 138. For example, the inner wall 102 can have a circular shape with an inner wall diameter 140 and an inner wall height H. The inner wall diameter can be in a range of about 2" to about 6". In an embodiment, the inner wall diameter can be about 4".

The height H can be in a range of about 0.5" to about 4". In an embodiment, the height h can be about 1.5".

The inner wall 102 may have an inner wall thickness that can be in the range of about 0.005" to about 0.5". In an embodiment, the inner wall thickness 150 can be about 0.15" to about 0.3"

The cell volume 138 can be filled with a filler material. The filler material can be a suitable earthen material, such as gravel, grass (seed or sod), mulch, recycled glass, rock, stone, recycled/crushed concrete, recycled/crushed asphalt, and combinations thereof. While desirous to hold an earthen-based material, other filler materials are possible, including synthetics such as plastic or rubber. The filler material can be a filter material, such as activated carbon. The filler material can be any material provides both permeability and aid in load distribution, including optimization thereof.

The outer wall 100-inner wall 102 configuration can aid in functionality of the reconfigurable one piece water permeable paver 10 in that it can help contribute load bearing ability since one or more structural support can be formed between the outer wall 100 and the inner wall 102.

While the cells 70 and 80 could simply just have a solid thickness instead of walls 100 and 102, the space or gap between the walls aids in construction of the reconfigurable one piece water permeable paver. That is, a reconfigurable one piece water permeable paver with a solid, wide material thickness would be commercially impracticable to make and use.

The outer wall 100 can have a circular shape with an outer wall diameter 142 and an outer wall height H1. The outer wall diameter can be in a range of about 4" to about 8". In an embodiment the outer wall diameter can be about 6".

The outer wall height H1 can be in a range of about 0.5" to about 4". In an embodiment the outer wall height H1 can be about 1.5". In an embodiment the outer wall height H1 of the outer wall 100 can be substantially equal (+/−0.01") to the height h of the inner wall 102.

The outer wall 100 can have an outer wall thickness that can be in the range of about 0.005" to about 0.5". In an embodiment, the outer wall thickness 152 can be about 0.15" to about 0.3".

The top surface 104 can be an integrally formed or connected surface between the outer wall 100 and the inner wall 102. The top surface 104 can be generally planar on its topside and underside.

Although not viewable in the Figures, the top surface 104 can have a top surface thickness that can be in the range of about 0.005" to about 0.5". In an embodiment, the top surface thickness can be about 0.15" to about 0.3"

One or more of the plurality of structural support ribs can be integrally formed between the outer wall 100, the inner wall 102, and the top surface 104. The structural support ribs 108 can have dimensions (such as rib height, rib width, and rib thickness) to accommodate dimensions and structure of the plurality of inner cells 70 and plurality of outer cells 80. In an embodiment, there can be about 10 to about 20 structural support ribs 108. As shown in the Figures, there can be about 12 structural support ribs 108 a-l. The structural support ribs 108 can be positionable between the outer wall 100 and the inner wall 102 in a symmetrical and/or asymmetrical manner.

The reconfigurable one piece water permeable paver 10 can include a plurality of third walls 120. There can be at least one third walls 120a conjoining between an at least one respective inner cell 70a and outer cell 80. The third wall(s) 120 can be construed as an area or region where an outer wall 100 of a respective cell comes into a coterminous (or conjoined, integral, etc.) relationship with another outer wall 100 of another respective cell. This helps provide a 'one piece' configuration to the reconfigurable one piece water permeable paver 10.

The plurality of inner cells 70 and/or plurality of outer cells 80 can include a locating rib 24. The locating rib(s) 24 can be used for aiding the position of an insert marker. The locating rib 24, while integral therewith, can be about a ¼" protrusion from inner wall 102. The locating rib 24 can be about ½" in height. The locating rib 24 can be generally shaped or otherwise configured to mate with a respective insert slot of the marker insert 44.

Each cell 70/80 can have a central point of reference or center point.

One or more of the plurality of outer cells 80 and the plurality of inner cells 70 can also have a permeable bottom portion 110. The permeable bottom portion 110 can be formed integral to a bottom region 156 of the inner wall 102 around the entire inner wall diameter 140.

The permeable bottom portion 110 can provide 100% permeability and reduce or remove drainage concerns that are present with conventional paving.

The permeable bottom portion 110 can have a generally flat (horizontal) layer having one or more gaps (e.g., slots, voids, etc.) 158a-158e or slots disposed therein. In an embodiment there can be five gaps 158a-158e. The gaps 158a-158e can be sufficient in size and shape to aid in load distribution of the reconfigurable one piece water permeable paver 10, but provide adequate permeability for fluids (such as rain) to drain from the surface into the ground. The permeable bottom portion 110 can be in the form of a discernable shape or pattern, such as an "X" (or resemble other letters such as 'I' or 'H'), hashtag (#), zigzag, and so forth.

In embodiments, the reconfigurable one piece water permeable paver 10 can include four inner cells 70 surrounded by a perimeter of twelve outer cells 80.

Figure 5:
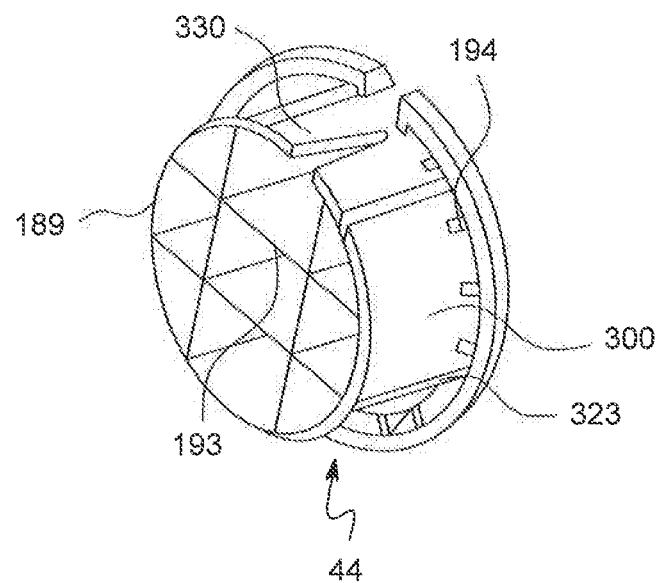
FIG. 5 depicts an isometric view of an embodiment of a marker insert according to an embodiment.

FIG. 5 depicts a marker insert 44 according to one or more embodiments. Each marker insert can be disposed in at least one of the outer two connection cells 32, outer three connection cells 30, outer flex joint connection cells 26, inner single flex joint connection cells 34, inner dual flex joint connection cells 36, and inner four connection cells 38, and combinations thereof.

The marker insert can have a continuous body wall 300 with a body diameter, a plurality of tensioning marker rib 323 extending from the continuous body wall 300, and an insert head with an insert head diameter extending beyond the continuous body wall, wherein the body diameter is substantially equal to an inner wall diameter of at least one of the plurality of connection cells.

In embodiments, the marker insert 44 can have a flexible locking dog 330 extending from the continuous body wall 300 wherein the flexible locking dog 330 is configured to flex inward into or under an inner wall of an at least one of the plurality of inner connection cells or outer connection cells when the marker insert comes into approximate contact with respective permeable bottom portions of each connection cell.

The marker insert 44 can have a circular shaped insert body 189. The circular shaped insert body can be configured with a plurality of insert support ribs 193. The insert support ribs 193 can help provide load support and structural rigidity to the marker insert 44.

The marker insert 44 can have a circular shaped insert body 189. The insert body can be configured with a plurality of insert support ribs 193. The insert support ribs 193 can help provide load support and structural rigidity to the marker insert 44.

The marker insert 44 can be configured with a plurality of head support ribs 194.

Figure 6:
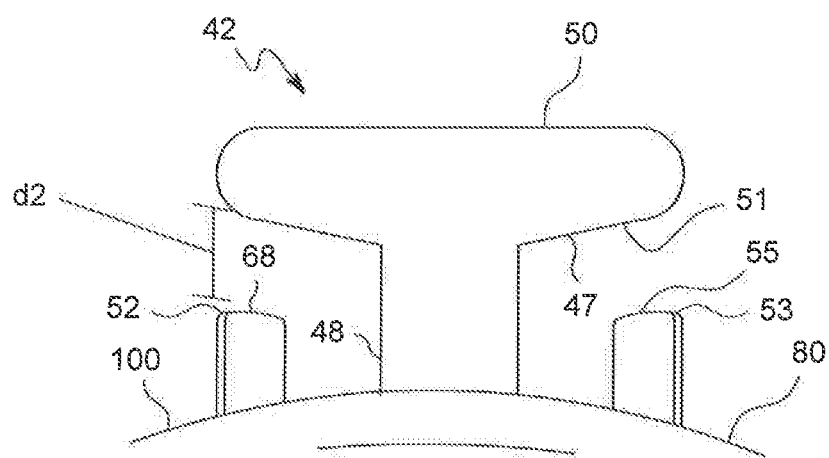
FIG. 6 depicts a locking tab according to an embodiment.

FIG. 6 shows a detail view of a locking tab 42 according to one or more embodiments.

The locking tab 42 can have a shaft 48 with a shaft length extending from the outer wall 100 of a respective outer cell 80. The reconfigurable one piece water permeable paver can include a plurality of locking tabs 42. One or more locking tabs 42 can have a shaft 48 that can extend outward from a respective outer wall 100, the shaft 48 being configured to fit within the corresponding keyway.

The locking tab 42 can include a head 50 formed integral to the shaft 48. The locking tab 42 can have the head 50 connected to the shaft 48 at an angle 47. The head 50 of the locking tab 42 can have a head length. The head length 61 for the locking tab 42 can be larger than the shaft length.

The head 50 can have a load surface 51. The load surface 51 can have a slope that matches an outer wall 100 inner surface curvature of the outer cell 80 enabling the head 50 to mate with a corresponding surface curvature proximate to the keyway of another reconfigurable one piece water permeable paver.

Each head 50 of the locking tab 42 can include a planar outer surface. The load surface 51 can be a rounded inner load support surface or be a surface with curvature. The load surface 51 can be configured to smoothly engage a corresponding rounded inner surface of a second reconfigurable one piece water permeable paver outer wall (not shown here). The second reconfigurable one piece water permeable paver outer wall can have a second reconfigurable one piece water permeable paver outer wall keyway.

The load surface 51 can be linear in lateral cross-section or can have a radius. The angle 47, if present, can be an angle from 80 degrees to 110 degrees from an axis of the shaft 48.

The load surface 51 can have a slope that matches an inner wall surface curvature of a respective cell, thereby enabling the head 50 to mate with a corresponding surface curvature proximate to the keyway of another reconfigurable one piece water permeable paver (not shown here).

A first sloped edge 52 can extend from the outer wall 100 of the outer cell 80. The first sloped edge 52 can be parallel with and spaced apart from the shaft 48 and also in a spaced apart relationship to the head 50.

An outer edge of the first sloped edge 52 can have a curvature complimentary to the outer wall curvature of a cell of another reconfigurable one piece water permeable paver having a corresponding keyway (not shown here) into which the head 50 interlocks.

The outer length aspect of the first sloped edge 52 can have a width larger where the first sloped edge attaches to the outer wall 100 than the width at the outer edge 63. The first sloped edge can be tapered in embodiments.

A second sloped edge 53 can extend from the outer wall 100 of the outer cell 80.

The second sloped edge 53 can be parallel with and spaced apart from the shaft 48 and can also be in a spaced apart relationship to the head 50.

The second sloped edge 53 can be opposite the first sloped edge 52.

The first and/or second sloped edges 52, 53 can be suitable to provide tension support (via a snug tolerance fit) with a second paver outer wall of a second paver outer cell. Thus, the distance (or clearance) d2 can be slightly less than an outer wall thickness of the second paver.

An outer edge 55 of the second sloped edge 53 can have a curvature complimentary to the outer wall curvature of a cell of another reconfigurable one piece water permeable paver having a corresponding keyway (not shown here) into which the head 50 interlocks.

The outer length aspect of the second sloped edge 53 can have a width larger where the second sloped edge attaches to the outer wall 100 than the width at the outer edge 55. The second sloped edge can be tapered in embodiments.

The head 50 can be planar, while load surface 51 can be rounded. In this respect the load surface 51 can be configured to smoothly engage a corresponding rounded inner surface of an outer wall (associated with a respective keyway) of a second reconfigurable one piece water permeable paver.

Figure 7:
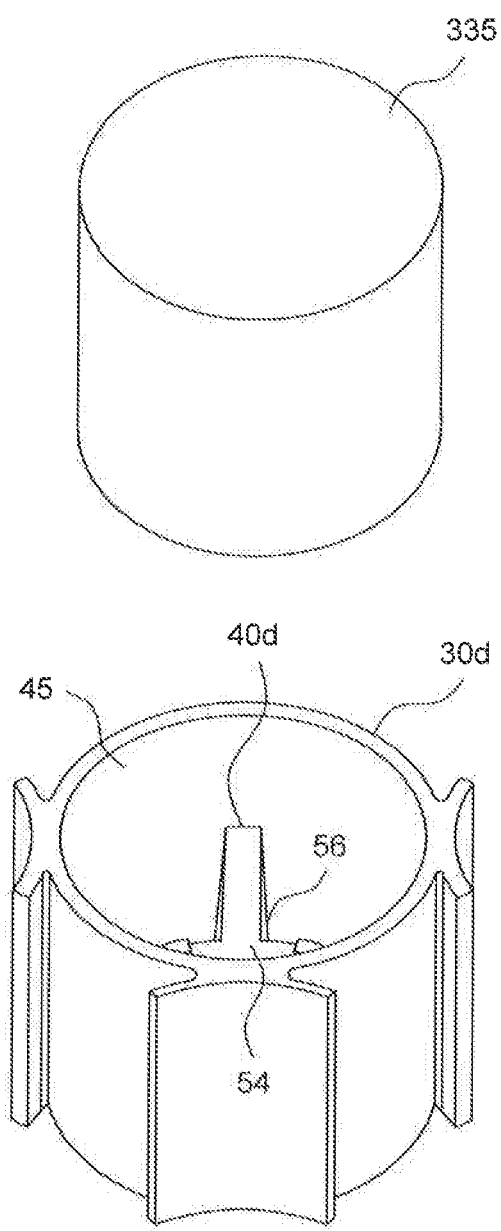
FIG. 7 depicts an exploded view of a marker insert and cell of a connection cell.

FIG. 7 depicts a detail of an inner surface of a cell of the reconfigurable one piece water permeable paver according to one or more embodiment with a parking marker.

In embodiments, a parking marker 335 can be insertable into one of the cells to provide parking guidance to users, such as marking edges of parking spaces. This use of a parking marker enables a user to avoid the need for painting dirt, aggregate, or similar surface materials.

An inner surface 45 of an outer three connection cell 30d is shown with a fastening slot 40d.

The fastening slot 40d can be tapered from the bottom of the cell towards the top.

In embodiments, each fastening slot 40d can have an alignment opening 54 formed in the fastening slot for engaging a locking tab 42.

In embodiments, each fastening slot 40d can have a tensioning rib 56 adjacent the fastening slot. In embodiments, a tensioning rib can be positioned on both sides of the fastening slot 40d.

In embodiments, the tensioning ribs 56 can be located on an external surface of the body of one or more integral interlocking supports.

Figure 8:
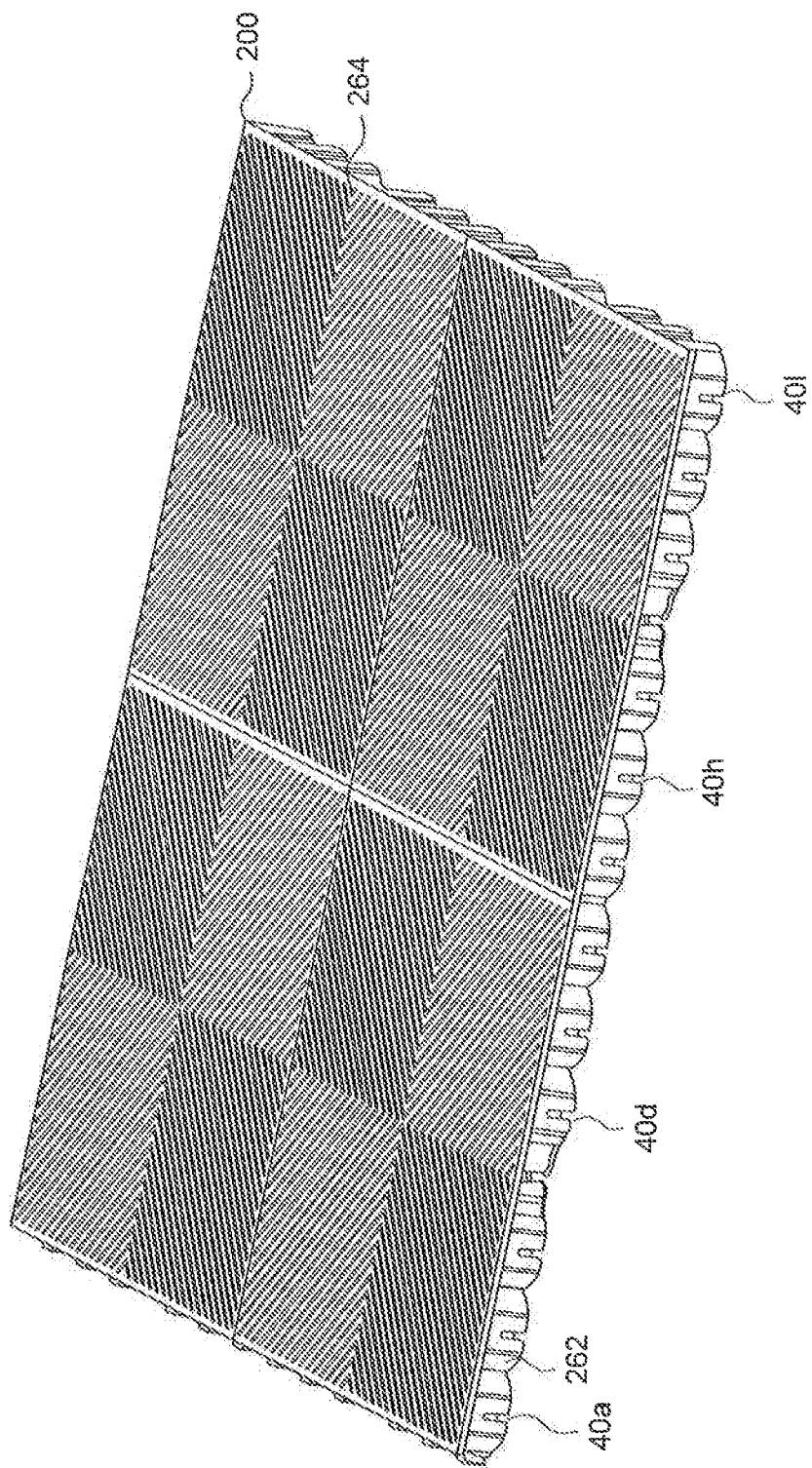
FIG. 8 depicts a traffic tile usable in the system.

FIG. 8 depicts a plurality of reconfigurable one piece water permeable pavers according to one or more embodiments.

Each reconfigurable one piece permeable paver of the plurality of connected reconfigurable one piece water permeable pavers 262 with a plurality of fastening slots 40a-40l can be covered with an interlocking traffic tile of the paver plate 200. The plurality of grooves, the plurality of ribs, or the plurality of perforations extending from the top side of the paver plate can be in a plurality of triangular patterns 264.

The fastening slots 40a-l for each respective outer connection cell are cut from the bottom of the paver extending partially towards the top, each fastening slot configured for receiving a marker insert.

In embodiments, the paver plate 200 is substantially planar, and made of a recycled plastic.

In embodiments, locking tabs for each respective outer connection cell is formed integral to the respective outer wall between a bottom of the paver plate 200 and a top of the paver plate 200.

Figure 9A:
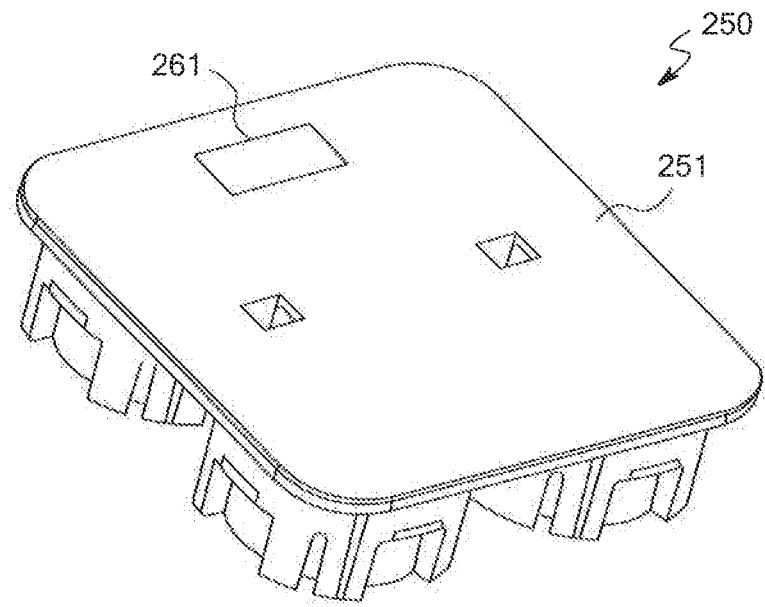
FIGS. 9A-9C depict a marking plate tile usable in the system.
Figure 9B:
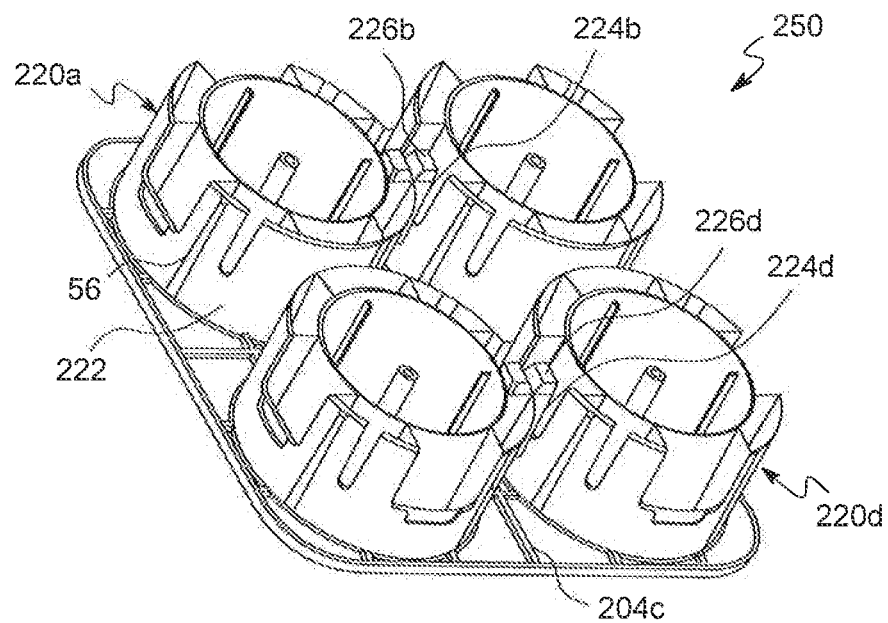
Figure 9C:
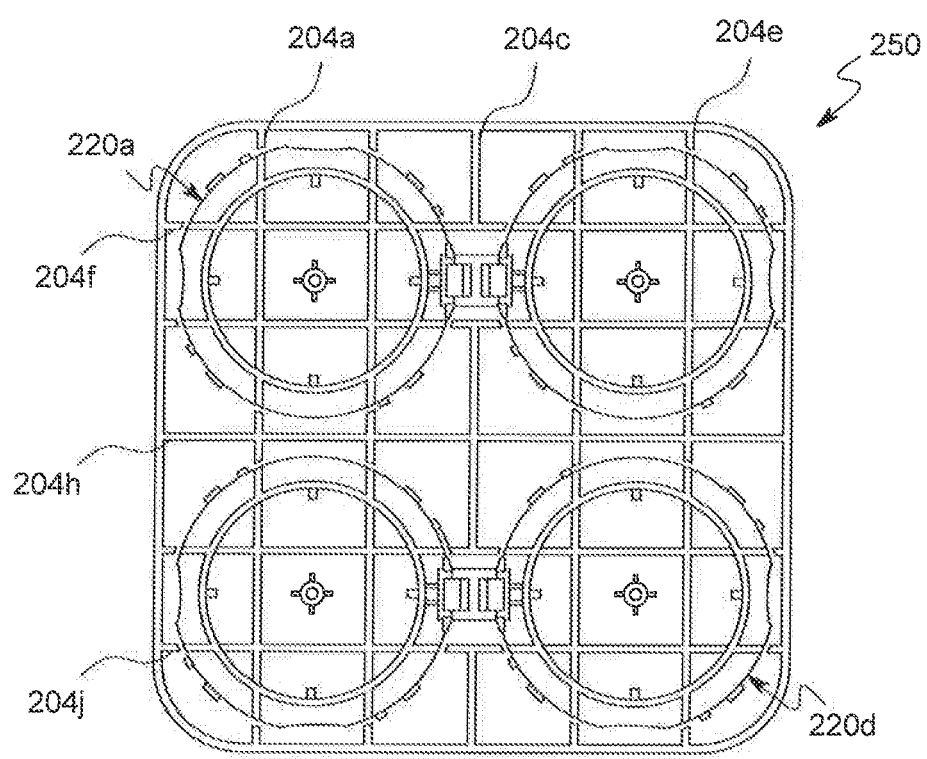

FIGS. 9A-9C depict interlocking marking traffic tiles according to one or more embodiments.

The interlocking marking traffic tiles 250 for a reconfigurable one piece water permeable paver can have a plurality of connection cells configured to support traffic.

The interlocking marking traffic tile 250 can have a marking plate tile 251 with a marking plate top side formed over a plurality of intersecting beams 204a-204j.

The marking plate tile 251 can be made from molded polyethylene, polypropylene or from crystalline alpha olefins.

In embodiments, the marking plate tile 251 can be made from a composite, including graphite composite with high strength and flexibility.

The marking plate tile 251 can sustain temperatures from −58 degrees Fahrenheit to 194 degrees Fahrenheit without deforming.

The marking plate tile 251 can have an impact resistance of from IZOD value of 2.0 ft/lbs or greater.

The marking plate tile 251 can have a thickness from 0.08 inches to 1.5 inches and can be rectangular or square in shape.

In embodiments, the marking plate tile 251 can have the identical dimensions of the reconfigurable one piece water permeable paver or have a dimension less than the reconfigurable one piece water permeable paver.

At least one integral interlocking support 220a-220d can extend from the plurality of intersecting beams 204a-204j for locking to a connection cell of the reconfigurable one piece water permeable paver. The at least one integral interlocking support 220a-220d can have a body 222, wherein the body 222 can connect the marking plate to the connection cell of the reconfigurable one piece water permeable paver.

In embodiments, the body 222 can have at least one flex leg 224b and 224d projecting from the plurality of intersecting beams 204a-204j. Each flex leg can be at least partially integral with the body 222.

In embodiments, at least one locking foot 226b and 226d can extend from one of the flex legs 224b and 224d. Each locking foot can be removable, locking the marking plate to a connection cell of the reconfigurable one piece water permeable paver.

In embodiments, a plurality of tensioning ribs 56 can be formed on an external surface of the body 222 of at least one of the integral interlocking supports 220a-220d.

In embodiments, the marking plate tile 251 can have a unique identifier 261. The unique identifier can be a plurality of numbers, such as 22 indicating a parking space number, a plurality of number and letters, a plurality of numbers, letters, and symbols, or any unique code that can be used for identification.

The unique identifier can be a bar code, a QR code, or a series of symbols such as arrows pointing to an exit.

The unique identifier can project from the marking plate top side slightly in embodiments. In other embodiments the unique identifier can be flush with the marking plate top side.

In embodiments, the unique identifier can be embossed, laser etched, printed, imprinted or fastened into the marking plate top side.

In embodiments, an interlocking marking traffic tile 251 can cover the reconfigurable one piece water permeable pavers, or a plurality of permeable pavers.

Figure 10A:
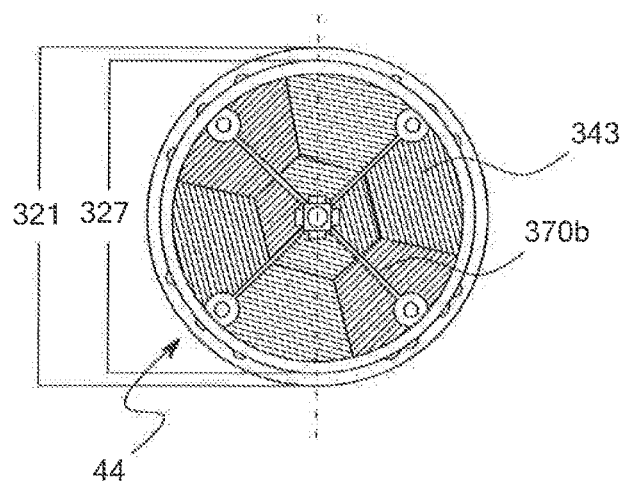
FIGS. 10A-10C depict bottom views of the marker insert.
Figure 10B:
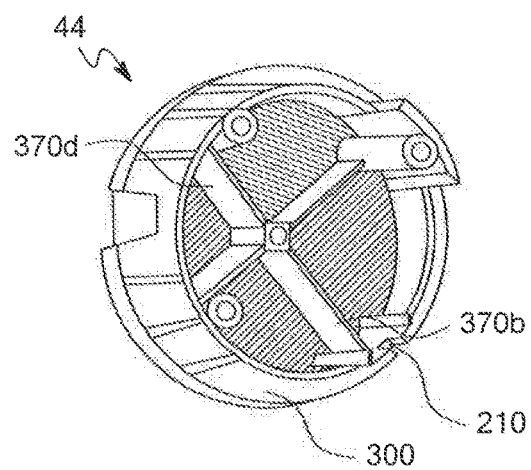
Figure 10C:
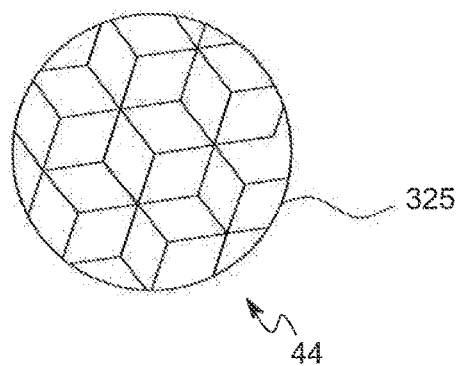
Figure 11A:
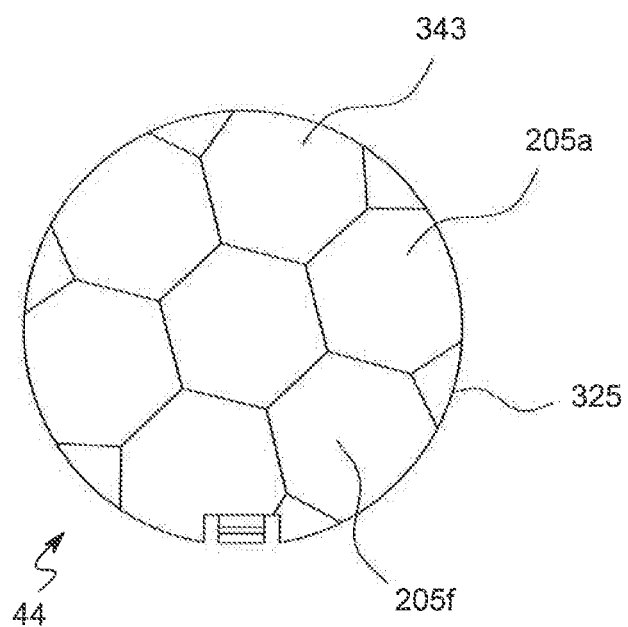
FIG. 11A-11D depict top views of the marker insert according to embodiments.
Figure 11B:
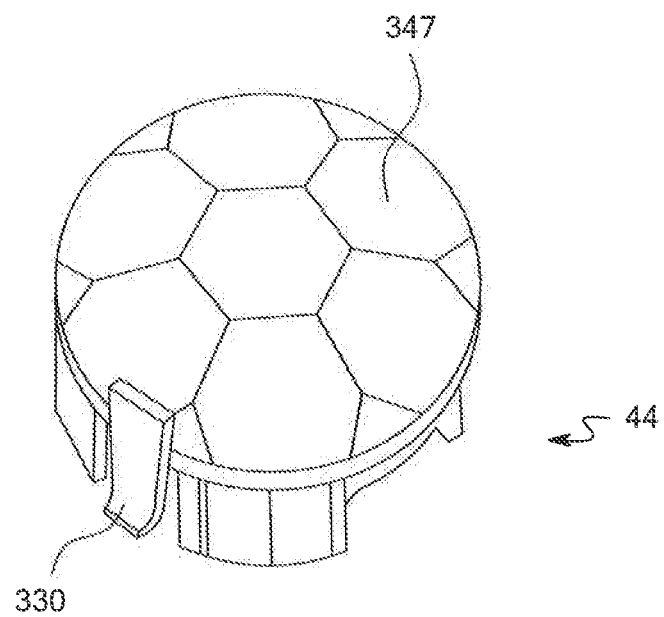
Figure 11C:
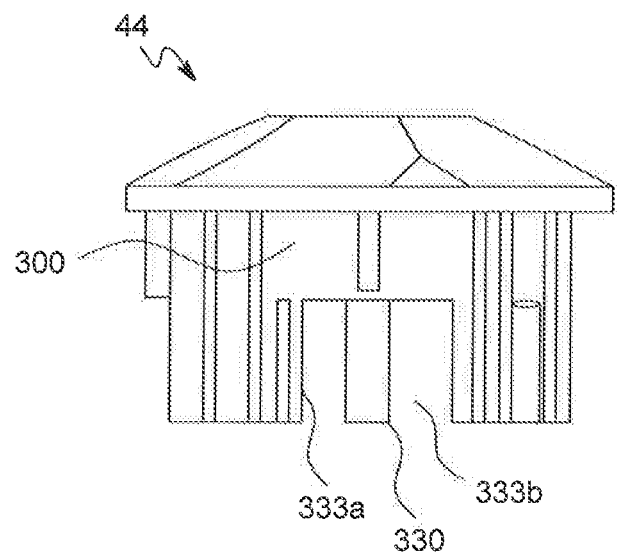
Figure 11D:
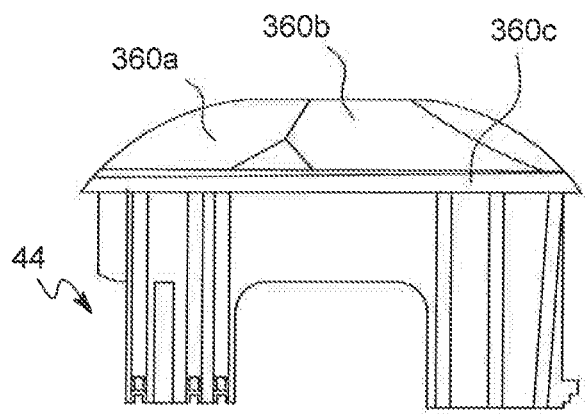

FIGS. 10A-10C depict a marker insert 44 with a continuous body wall 300.

The body wall 300 can have a body diameter 321. A plurality of tensioning marker rib can extend from the continuous body wall 300.

The body diameter of the marker insert 44 can be from one inch to one foot.

An insert head 325 with a prismatic inner surface 343 having, an insert head diameter 327, can extend beyond the continuous body wall 300, wherein the body diameter is substantially equal to an inner wall diameter of at least one of the plurality of connection cells.

An insert head diameter of marker insert 44 can be from one inch to one foot.

A plurality of head reinforcing beams 370a-370d can be mounted to the insert head 325 opposite the translucent top surface and between the continuous body walls 300. Each head reinforcing beam 370a-370d can have at least one of an identical hardened plastic or a material with ability to re-enforce impact resistance of the insert head.

The marker insert can contain a locating slot 210 through an outer surface of the body wall of the marker insert configured to engage a locating rib 202 formed on an inner wall of one of the connection cells.

In embodiments, each marker insert disposed in at least one of the outer two connection cells, outer three connection cells, outer flex joint connection cells, inner single flex joint connection cells, inner dual flex joint connection cells, and inner four connection cells, and combinations thereof.

FIGS. 11A-11D depict the insert head 325 of the marker insert 44 according to one or more embodiments.

The insert head 325 can contain a prismatic inner surface 343 comprising an array of mirrored polygonal shapes, 205a-205f and a translucent top surface 347 covering the prismatic inner surface 343 enabling light to penetrate to the inner surface and reflect outwardly from the insert head 325.

The mirrored polygonal shapes provide at least three different reflective light vectors 360a-360c. The mirrored polygonal shapes can have up to 300 vectors.

The marker insert 44 can have a plurality of clearance recesses 333 formed in the continuous body wall 300, wherein the plurality of clearance recesses have different dimensions.

Each insert head 325 can contain a water repellant plastic capable of resisting loads of over 3000 pounds per square inch without deforming and sustaining temperatures ranging from −50 degrees Fahrenheit to 180 degrees Fahrenheit without cracking or fracturing.

The marker insert can contain a flexible locking dog 330 extending from the continuous body wall 300. The flexible locking dog 330 is configured to flex inward into or under an inner wall of an at least one of the plurality of inner connection cells or outer connection cells when the marker insert comes into approximate contact with respective permeable bottom portions of each connection cell.

In embodiments, the insert head diameter 327 can be from 1 to 15% larger than the body diameter of the continuous body wall 300.

In embodiments, the insert head 325 can include a shape selected from the group: a dome shape, an arced rectangle, an arced square, or an arced polygon.

Figure 12:
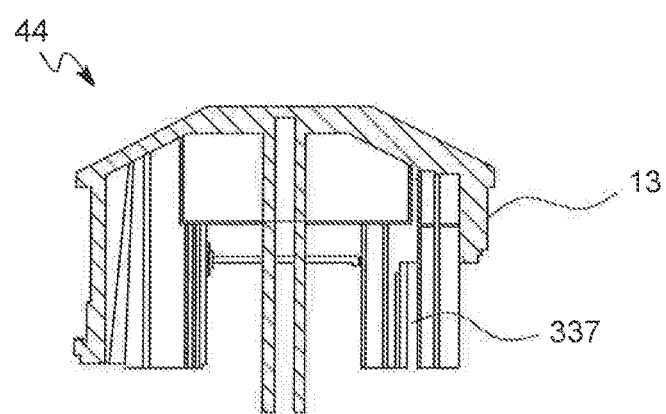
FIG. 12 depicts a cut view of the marker insert according to one or more embodiments.

FIG. 12 depicts the marker insert 44 with a receiving slot 337 configured for removably locking the marker insert into at least one of the plurality of inner connection cells or outer connection cells.

EXAMPLE 1

A reflective and directional water permeable paver system has a plurality of reconfigurable water permeable pavers 10 form a load bearing traffic surface for a parking lot.

A plurality of reconfigurable one piece water permeable pavers made from recycled plastic, wherein each reconfigurable one piece water permeable paver is connected on opposite sides to two reconfigurable one piece water permeable pavers.

Each reconfigurable one piece water permeable paver has a plurality of inner single flex joint connection cells, a plurality of inner dual flex joint connection cells, and a plurality of inner four connection cells.

Each reconfigurable one piece water permeable paver has plurality of outer three connection cells, a plurality of outer two connection cells, and outer flex joint connection cells, with spaces formed between cells, the connection cells and spaces configured to contain the fill material.

Each reconfigurable one piece water permeable paver has a plurality of locking tabs, at least one a extending from an outer surface of series of outer connection cells and a plurality of fastening slots formed in an outer surface of a corresponding series of outer connection cells configured for engaging one of the locking tabs.

The plurality of locking tabs for each permeable paver engages the plurality of fastening slots of an additional permeable paver, each permeable paver further configured to form a surface for supporting the load.

A plurality of marker inserts each marker insert disposed in at least one of the outer connection cells, and inner connection cells, and combinations thereof, each marker insert is made from acrylic and has a body walls with a body diameter of 3¼ inches, a plurality of tensioning marker ribs 101 extending from the body walls, and an insert head with an insert head diameter of 3½ inches extending beyond the body walls, wherein the body diameter is substantially equal to an inner wall diameter of at least one of the plurality of connection cells.

EXAMPLE 2

A reflective and directional water permeable paver system has a plurality of reconfigurable water permeable pavers 10 form a load bearing traffic surface for a parking lot.

A plurality of reconfigurable one piece water permeable pavers made from polypropylene, wherein each reconfigurable one piece water permeable paver is connected on opposite sides to two reconfigurable one piece water permeable pavers.

Each reconfigurable one piece water permeable paver has a plurality of inner single flex joint connection cells, a plurality of inner dual flex joint connection cells, and a plurality of inner four connection cells.

Each reconfigurable one piece water permeable paver has plurality of outer three connection cells, a plurality of outer two connection cells, and outer flex joint connection cells, with spaces formed between cells, the connection cells and spaces configured to contain the fill material.

Each reconfigurable one piece water permeable paver has a plurality of locking tabs, at least one a extending from an outer surface of series of outer connection cells and a plurality of fastening slots formed in an outer surface of a corresponding series of outer connection cells configured for engaging one of the locking tabs.

The plurality of locking tabs for each permeable paver engages the plurality of fastening slots of an additional permeable paver, each permeable paver further configured to form a surface for supporting the load.

A plurality of marker inserts each marker insert disposed in at least one of the outer connection cells, and inner connection cells, and combinations thereof each marker insert is made from polycarbonate and has a body walls with a body diameter of 4¾ inches, a plurality of tensioning marker ribs extending from the body walls, and an insert head with an insert head diameter of 5 inches extending beyond the body walls, wherein the body diameter is substantially equal to an inner wall diameter of at least one of the plurality of connection cells.

While these embodiments have been described with emphasis on the embodiments, it should be understood that within the scope of the appended claims, the embodiments might be practiced other than as specifically described herein.

What is claimed is:

1. A reflective and directional water permeable paver system forming a load bearing traffic surface comprising:
   a. a plurality of reconfigurable one piece water permeable pavers, wherein each reconfigurable one piece water permeable paver is connected on opposite sides to two reconfigurable one piece water permeable pavers, each reconfigurable one piece water permeable paver comprising:
- (i) a plurality of inner single flex joint connection cells; a plurality of inner dual flex joint connection cells; and a plurality of inner four connection cells;
- (ii) a plurality of outer three connection cells, a plurality of outer two connection cells, and outer flex joint connection cells, with spaces formed between cells, the connection cells and spaces configured to contain the fill material; and
- (iii) a plurality of locking tabs, at least one extending from an outer surface of a series of outer connection cells and a plurality of fastening slots formed partially through an outer surface of a corresponding series of outer connection cells configured for engaging one of the plurality of locking tabs;
  - wherein the plurality of locking tabs for each permeable paver engages the plurality of fastening slots of an additional permeable paver, each reconfigurable one piece water permeable paver further configured to form a traffic surface for supporting a load;
- b. a plurality of marker inserts each marker insert disposed in at least one of the outer two connection cells, outer three connection cells, outer flex joint connection cells, inner single flex joint connection cells, inner dual flex joint connection cells, and inner four connection cells, and combinations thereof, each marker insert comprising:
  - (i) a continuous body wall with a body diameter;
  - (ii) a plurality of tensioning marker ribs extending from the continuous body wall; and
  - (iii) an insert head with an insert head diameter extending beyond the continuous body wall, wherein the body diameter is substantially equal to an inner wall diameter of at least one of the plurality of connection cells.

2. The paver system of claim 1 wherein the marker insert comprises a flexible locking dog extending from the continuous body wall wherein the flexible locking dog is configured to flex inward into or under an inner wall of an at least one of the plurality of inner connection cells or outer connection cells when the marker insert comes into approximate contact with respective permeable bottom portions of each connection cell.

3. The paver system of claim 2, comprising a plurality of clearance recesses formed in the continuous body wall, wherein the plurality of clearance recesses have different dimensions.

4. The paver system of claim 2 comprising a receiving slot configured for removably locking the marker insert into at least one of the plurality of inner connection cells or outer connection cells.

5. The paver system of claim 1, comprising a paver plate mounted to a portion of the reconfigurable one piece water permeable pavers, wherein the paver plate is substantially planar, and wherein the paver plate is made of a recycled plastic.

6. The paver system of claim 5, wherein locking tabs for each respective outer connection cell is formed integral to the respective outer wall between a bottom of the paver plate and a top of the paver plate.

7. The paver system of claim 6, wherein the fastening slots for each respective outer connection cell are cut from the bottom of the paver extending partially towards the top, each fastening slot configured for receiving a marker insert.

8. The paver system of claim 1, each locking tab comprising:
- a. a shaft extending outward from one of the outer walls, the shaft being configured to fit within a corresponding fastening slot of a second paver; and
- b. a head extending outward from the shaft at an angle and formed integral with the shaft.

9. The paver system of claim 8, wherein each head of the locking tab comprises a planar outer load surface and a rounded inner load support surface, wherein the rounded inner load support surface is configured to smoothly engage a corresponding rounded inner surface of a second paver outer wall of the second paver, the second paver outer wall having the corresponding fastening slot formed therein.

10. The paver system of claim 1, comprising a locating slot through an outer surface of the body wall of the marker insert configured to engage a locating rib formed on an inner wall of one of the connection cells.

11. The paver system of claim 1, comprising a parking marker in at least one of the connection cells.

12. The paver system of claim 1, wherein the insert head is a one piece unit comprising:
- a. a prismatic inner surface comprising an array of mirrored polygonal shapes; and
- b. a translucent top surface covering the prismatic inner surface enabling light to penetrate to the inner surface and reflect outwardly from the insert head.

13. The paver system of claim 11, wherein the mirrored polygonal shapes provide at least three different reflective light vectors, the mirrored polygonal shapes (up to 30 vectors).

14. The paver system of claim 12, wherein each insert head comprises a water repellant plastic capable of resisting loads of over 3000 pounds per square inch without deforming and sustaining temperatures ranging from −50 degrees Fahrenheit to 180 degrees Fahrenheit without cracking or fracturing.

15. The paver system of claim 11, wherein the insert head diameter is from 1 to 15% larger than the body diameter of the continuous body wall.

16. The paver system of claim 11, comprising a plurality of head reinforcing beams mounted to the insert head opposite the translucent top surface and between the continuous body walls, each head reinforcing beam comprising at least one of: an identical hardened plastic or a material with ability to re-enforce impact resistance of the insert head.

17. The paver system of claim 11, wherein the insert head comprises a shape selected from the group: a dome shape, an arced rectangle, an arced square, or an arced polygon.

18. A load bearing traffic surface comprising the paver system of claim 1.

* * * * *